Oct. 6, 1959  H. E. ENGLESON ET AL  2,907,155
ARTICLE TRANSFER MECHANISM
Filed April 25, 1956  2 Sheets-Sheet 1

INVENTORS:
HARRY E. ENGLESON
ELMER D. SRAMEK

BY *Marzall, Johnston, Cook & Root.*
ATT'YS

Oct. 6, 1959  H. E. ENGLESON ET AL  2,907,155
ARTICLE TRANSFER MECHANISM
Filed April 25, 1956  2 Sheets-Sheet 2
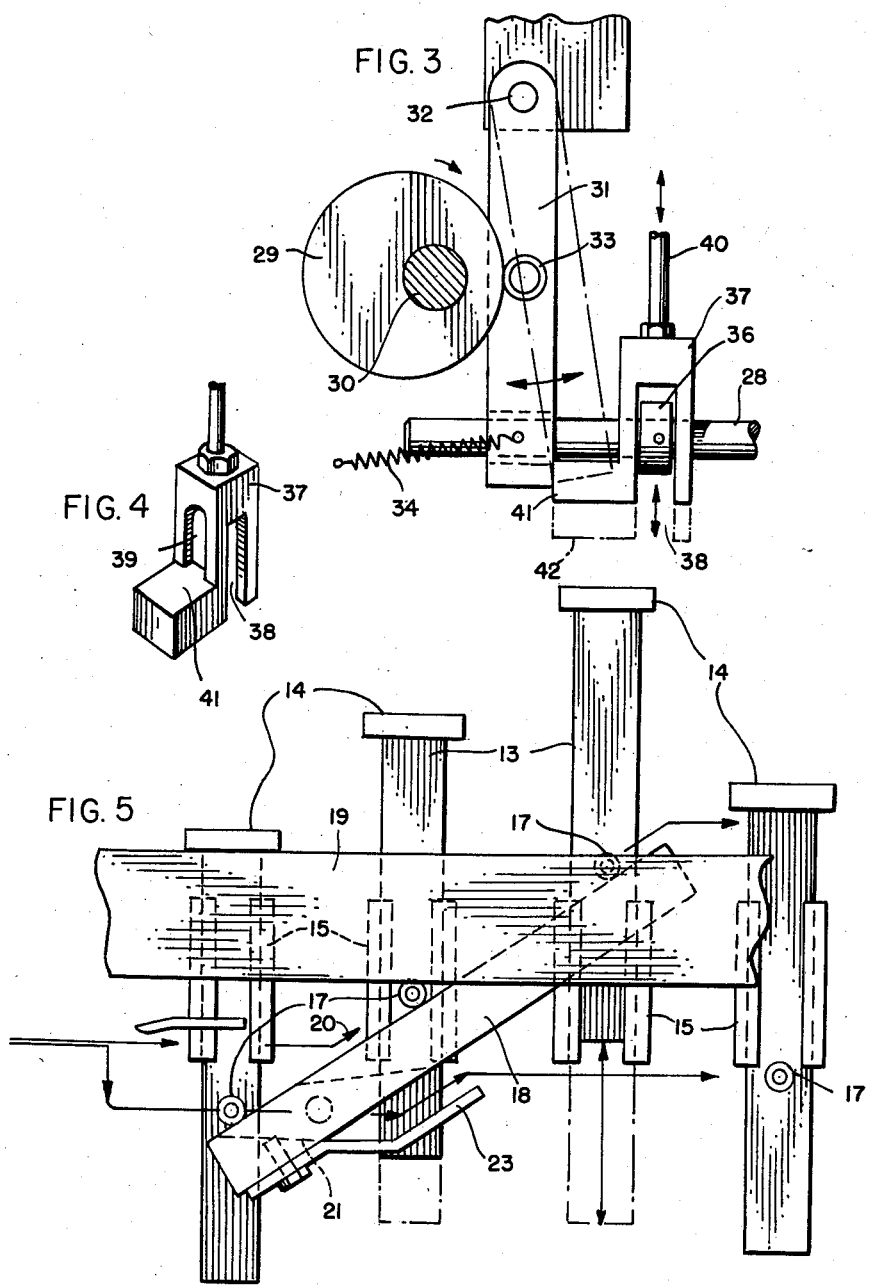
INVENTORS:
HARRY E. ENGLESON
ELMER D. SRAMEK
BY Marzall, Johnston, Cook & Root
ATT'YS United States Patent Office

2,907,155
Patented Oct. 6, 1959

2,907,155
ARTICLE TRANSFER MECHANISM

Harry E. Engleson, Chicago, and Elmer D. Sramek, Cicero, Ill., assignors to F. B. Redington Co., Bellwood Village, Ill., a corporation of Delaware Application April 25, 1956, Serial No. 580,626

13 Claims. (Cl. 53—63)

This invention relates to machines for packaging articles in cartons and, more particularly, to such machines having a conveyer for carrying the articles, and another or second conveyer for carrying cartons to receive the articles from the first conveyer.

Articles of manufacture for retail sale and public consumption may be conveniently packaged in cartons of cardboard, or the like. Machinery for packaging articles in cartons may utilize a conveyer with specially adapted pockets or buckets for carrying a predetermined number of the articles in a predetermined configuration. The present invention comprises a second conveyer having buckets for holding or carrying cartons in spaced relation to the buckets on a first conveyer such that the articles may be transferred thereto. To facilitate the transfer of the articles from the first buckets into the cartons held by the second buckets, the two conveyers may be disposed parallel to, and move in synchronism with, each other, thereby maintaining the required spaced relation.

Apparatus for transferring or cartoning the articles may include a plurality of pusher members carried parallel to, and in synchronism with, the buckets of the two conveyers. The pusher members may be slidably mounted on their movable supports, and may have a part for engaging a stationary cam surface. Thus, as the pusher members move in synchronism with the conveyer, the cam surface causes each member to slide transversely across the first conveyer toward the second conveyer. Articles from the first conveyer are thus pushed transversely therefrom and received in the cartons carried on the second conveyer.

Since the first conveyer may terminate as soon as the articles are pushed therefrom, end support means, such as a sprocket wheel, may be provided around which the buckets of the conveyer may move. The buckets assume an inverted position for their return to the initial or starting point of the conveyer. The second conveyer carries the cartons which are filled by the articles from the first conveyer and then closed and transported to a further point where they may be received and stored prior to shipping. If any of the packaging machinery malfunctions, such that a completely packaged end product is not possible, the articles carried by the first conveyer constitute a potential hazard which may cause jamming of the machine and may result in costly shutdowns. Thus, if no carton appears in the buckets of the second conveyer, it is not desirable to operate the pusher member or transfer mechanism associated with that bucket, since the articles, if transferred into an empty bucket intended for carrying cartons, would cause trouble. In such an instance, the articles should remain in the buckets of the first conveyer which would continue around the sprocket at the end of the conveyer, assume an inverted position, and drop the articles therefrom into a receptacle which may be conveniently placed below the sprocket, thus disposing of the articles and eliminating the potential hazard therefrom.

An object of this invention is to provide improved transfer means for transferring articles from buckets on a first conveyer into cartons on a second conveyer, the transfer means cooperating with a detector, or carton-sensing device, for preventing such transfer if a carton fails to appear or is incorrectly positioned in a bucket of the second conveyer.

A further object of this invention is to provide a packaging machine with transfer apparatus including a plurality of pusher members, the pusher members normally functioning to move transversely across the article carrying conveyer but having a disabling means for preventing the normal function thereof in response to the carton-sensing device associated with the first conveyer.

Another object is to provide a plurality of pusher members for transferring articles from one conveyer to another, the pusher members being adapted to move alternatively in either of two paths; when in a normal operative path, the pusher member will move across the first conveyer and transfer articles therefrom, but when shifted to an inoperative path, the pusher member will fail to move transversely across the bucket and thus the articles will not be transferred therefrom.

A more complete understanding of the present invention, its mode of operation and its advantages may be gathered from further reading of this specification, together with an inspection of the accompanying drawings in which:

Fig. 3 is a detail vertical sectional view on the line 3—3 of Fig. 1, and showing particularly the reciprocating drive means and the detector responsive device for coupling the drive means for drivingly engaging the shift means for disabling the pusher members;

Fig. 4 is a detail fragmentary perspective view on the line 4—4 of Fig. 1, and showing the device for engaging the shift means with the reciprocatory drive means; and Fig. 5 is a detail plan view of the transfer mechanism particularly illustrating the pusher members and the stationary cam arrangement.

Figures 1, 2:
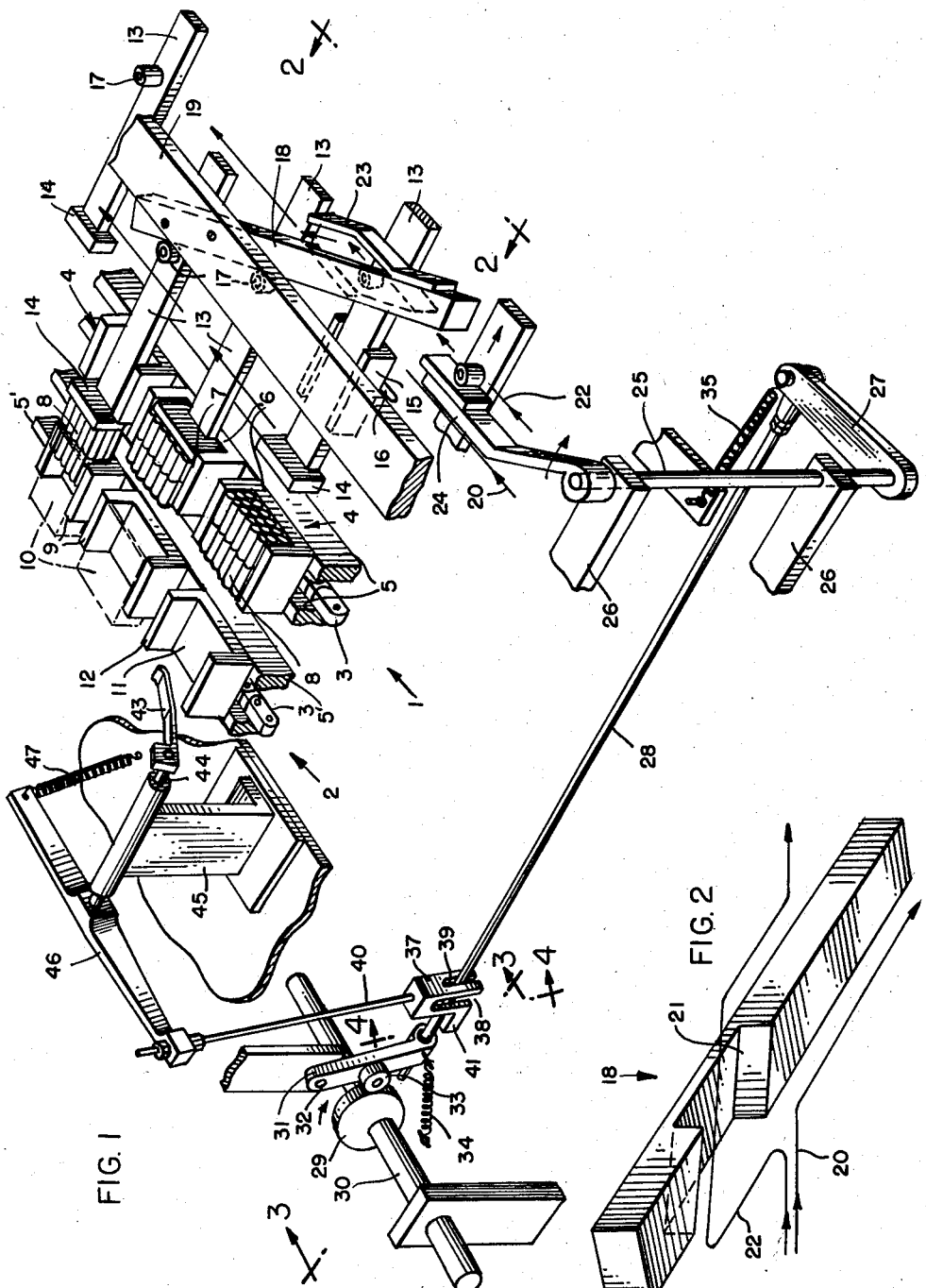
Fig. 1 is a detail perspective view of a part of a machine for packaging articles in cartons, the view particularly illustrating the article transfer mechanism and the cooperating detector, or carton-sensing device, according to the teachings of this invention.
Fig. 2 is a detail fragmentary perspective view looking in the direction of the arrows 2—2 of Fig. 1, and showing the cam for operating the pusher members of the article transfer mechanism.

The machine incorporating the teachings of the present invention may be used for packaging any type of articles of uniform size and shape which are suitable for insertion into a carton wherein they will rest in a predetermined configuration. As illustrated in Fig. 1 of this invention, the articles may be rolls of candy or rolls of medicinal tablets, the rolls being generally of a cylindrical shape. The particular articles, Fig. 1, are shown as being arranged for packaging thirty-six in a carton in a configuration which comprises two rows end-to-end and six rows side-by-side in three layers or tiers. Since other regularly shaped articles may be packaged or cartoned in a similar manner, it is not intended that this invention be restricted to the precise configuration illustrated.

The packaging machine, Fig. 1, comprises generally a first conveyor 1 and a second conveyer 2. Both conveyers are carried upwardly and to the right, Fig. 1, by the respective conveyer chains 3 which are driven synchronously. The conveyer 1 includes a plurality of pockets or buckets 4 which are slidably supported on a pair of rails 5. Each bucket 4 includes a horizontal base portion 6 and a pair of upstanding walls 7 in opposed spaced relation at the leading side and trailing side of the bucket. The bucket is dimensioned to properly contain a predetermined number of articles 8.

The second conveyor 2 is similarly slidably supported on a pair of rails 5' and contains pockets or buckets 9 dimensioned to hold and carry cardboard cartons 10. The buckets 9 likewise comprise a horizontal base part 11 and a pair of upstanding walls 12 on the leading and trailing sides thereof. The transverse width of a carton carrying bucket 9 may be less than the length of a carton adapted to rest therein.

The article transfer mechanism includes a plurality of pusher members 13 which comprise generally an elongated bar or shank portion and a foot part 14 which provides an appropriate abutment surface for engaging the articles and moving them transversely across the buckets 4 on the conveyor 1. Each pusher member is carried by a U-shaped support 15 in which it may slide in a direction transverse to the conveyer movement. The support members 15 move on a chain 16 which is synchonized with the chains 3 carrying both conveyors 1 and 2. Thus, it may be appreciated that the pusher members 13 move parallel to and in synchronism with both of the conveyers and that the pusher members are free to slide transversely across the buckets 4 of the first conveyor. Each pusher member carries an engageable part or cam roller 17 which extends upwardly from the shank part thereof. A stationary cam 18 is mounted diagonally over the pusher members and fixed to a support member 19 which constitutes a part of the frame of the machine. As a pusher member moves along a normal path such that its cam roller 17 follows the arrow indicated at 20, the cam roller 17 engages the stationary cam 18 which causes the pusher member 13 to slide transversely across the buckets 4.

As may be particularly seen in Fig. 2, the cam 18 has a groove or passage 21 extending therethrough; and if any pusher member is shifted transversely away from the conveyors 1 and 2, the cam roller 17 may pass through the groove 21 of the cam 18 without engaging the cam surface. Thus, the cam engaging part 17 of the pusher member 13 may either follow an operative path 20 in engagement with the cam 18, or it may follow an inoperative path 22 wherein the cam engaging part 17 passes through the passage 21. A second cam surface 23 is positioned to engage the cam roller after passage through the groove 21 and thereby to move or shift the pusher member 13 back to its normal position. By following the inoperative path 22, the pusher member will not move across a corresponding bucket 4 of the conveyor 1 and the articles will not be transferred therefrom.

The pusher members 13 may be shifted to the inoperative path 22 by a shift arm 24. The shift arm 24 is fixed to a vertical shaft 25 which is pivotally mounted in bearing support members 26 which are a part of the stationary frame of the machine. The shaft 25 and the shift arm 24 are driven by an arm 27 attached to the shaft 25 and pivotally connected to a link 28. Thus, the shift arm 24 is pivoted and an appropriate pusher member 13 is shifted to an inoperative position when the link 28 is moved to the right, Fig. 1.

Drive means for the link 28 and the shift member 24 includes a continuously rotating cam or eccentric 29 which turns continuously on a main drive shaft 30. An arm 31 is pivoted at a fixed point 32 on the frame of the machine and contains a cam follower or roller 33. A spring 34 urges the arm 31 to the left, Figs. 1 and 3, such that the cam follower 33 continually rides against the cam or eccentric 29. The arm 31, therefore, continuously reciprocates or oscillates, and constitutes a continuously oscillating drive means which may move the link 28 to the right and operate the shift arm 24. A spring 35 is connected to urge the arm 27 and the link 28 to the left, Fig. 1, and thus the link moves to the right only when divingly coupled to the arm 31.

Although the arm 31 continually oscillates or reciprocates by action of the cam or eccentric 29, this arm is not positively connected to the link 28 and, therefore, the link 28 does not move with the arm. Fig. 3 particularly illustrates a drive coupling for the link 28 which includes a collar 36 fixed to the link 28 and a coupling member 37. The coupling member 37 contains intersecting slots 38 and 39 generally arranged in vertical planes extending perpendicular to each other. The collar 36 is positioned in the first slot 38 and the link 28 extends through the second slot 39 at right angles to the slot 38.

A link 40 is attached to the coupling member 37 and may raise or lower the coupling member with respect to the link 28. The coupling device 37 contains a shoulder part 41 which is engageable with the lower part of the oscillating drive arm 31. Fig. 3 illustrates the positioning of the coupling device in a raised position, and it will be noted that the lower extremity of the arm 31 will engage and abut against the shoulder part 41. As the arm 31 moves to the right as indicated by dashed lines in Fig. 3, the shoulder part 41 may engage the arm 31 and be moved thereby. Since the collar 36 is within the slot 38 and is secured to the link 28, the link will be moved thereby as the arm 31 and the coupling device 37 is moved. If the coupling device 37 were in its lowered position, as shown by dashed lines 42 in Fig. 3, the shoulder part 41 would fail to be engaged by the oscillating arm 31 and, therefore, the coupling device 37 together with the collar 36 and link 28, would remain stationary as the arm 31 continues to oscillate and move to the right.

A detector arm 43, Fig. 1, is pivotally mounted at 44 on a stationary bracket 45 attached to the frame of the machine. A lever 46 is mounted to pivot with the detector arm 43. A tension spring 47 urges the right-hand arm of the lever 46 downwardly (as shown in Fig. 1) and, therefore, the detector arm 43 is likewise urged downwardly. The left-hand arm of the lever 46 is connected to the link 40. The detector arm 43 is urged downwardly by the spring 47 and, accordingly, the link 40 and the coupling device 37 are urged upwardly. The lever arm 43 is positioned in close spaced relation to the conveyor 2 and would normally drop into each of the pockets or buckets 9 as the conveyor 2 moves thereunder. Since each bucket 9 of the conveyor 2 normally contains a cardboard carton 10, the detector arm 43 will be forced upwardly thereby, such that it rides across the cartons 10 within the buckets. As the detector arm 43 continues to be held upwardly by the cartons 10, the link 40 and the coupling device 37 are held downwardly. Thus, while cartons 10 appear in each of the buckets 9 of the second conveyor 2, the coupling device 37 remains depressed, the link 28 together with the shift arm 24 will remain stationary, and the pusher members 13 will follow the operative path, thus transferring articles 8 into the cartons 10.

If, however, a carton 10 fails to appear under the detector arm 43, that arm will move downwardly and the link 40 and coupling device 37 will pivot upwardly. The shoulder part 41 of the coupling device 37 will thence be interposed between the oscillatory drive arm 31 and the collar 36 fixed to the link 28. The link will move to the right, Fig. 1, and the shift arm 24 will move causing a pusher member 13 to be shifted to the inoperative path 22.

The detector arm 43 and the linkage 40, 44 and 46 is sensitive to the presence or absence of a carton 10 on the second conveyor 2, and the coupling device 37 constitutes a means for coupling a continually oscillating or reciprocating drive means to the shift arm or shift means in response to movement of the detector arm 43. Thus, the pusher members 13 are shifted from the operative path 20 to the inoperative path 22 as the absence of a carton is detected in the first conveyer. The transfer of articles from the first conveyer to the second conveyer is thereby accomplished only when there is a carton positioned in the second conveyer to receive the articles. When no such carton appears, the pusher members 13 remain inoperative and the articles remain in the bucket of the first conveyer until after such bucket has rotated around the sprocket to an inverted position.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. In a packaging machine having a first conveyer with buckets for carrying articles and a second conveyer with buckets for carrying cartons in spaced relation to the article carrying buckets, means for driving said conveyers continuously at a constant speed, pusher members operatively moving with the conveyers for transferring the articles from the article carrying buckets to the cartons, apparatus for selectively disabling the pusher members momentarily when cartons fail to appear in the buckets of the second conveyer, said apparatus comprising the normally quiescent means for shifting the pusher members from an operative path to an inoperative path, drive means, and a carton-sensing means sensitive to the absence of a carton in a bucket of the second conveyer, said carton-sensing means being operable to couple the drive means to the normally quiescent means and thereby to momentarily selectively shift a pusher member to the inoperative path during continued operation of the conveyers.

2. In a packaging machine having two parallel conveyers and a plurality of pusher members carried by one of said conveyers and arranged to transfer articles from said one conveyer to cartons in buckets on the other conveyer, stationary means having a part thereon normally coacting engagingly with a part on the pusher members for driving the pusher members and having another part thereon coacting with said part on the pusher members for rendering the pusher members nonoperative when cartons are not present in buckets of said other conveyer, said apparatus comprising a shift arm adapted to engage and shift the pusher members from an operative position to a nonoperative position, a normally quiescent rod drivingly coupled to the shift arm, a reciprocatory drive member in spaced relation with the rod, a detector arm positioned over said other conveyer and adapted for contacting cartons in the buckets and a rod control means responsive to movement of the detector arm and operative to drivingly engage the normally quiescent rod with the drive member whereby the shift arm operates in response to movement of the detector arm and a pusher member is shifted to a nonoperative position when no carton appears in a bucket of said other conveyer.

3. In a machine having a first conveyer with pockets for carrying articles and having a second conveyer for carrying cartons in spaced relation with the pockets, means for driving said conveyers continuously at a constant speed, apparatus for pushing the articles from a pocket only when a carton appears in position to receive the articles therefrom, said apparatus comprising a pusher member adapted to move across the pocket from an operative position adjacent thereto, drive means positioned to engage the pusher member in the operative position for driving said pusher member across the pocket, detecting means associated with the second conveyer for detecting the absence of a carton thereon, and means associated with and responsive to the detecting means for momentarily moving the pusher member from the operative position to an inoperative position where the drive means will fail to engage the pusher member during continued operation of the conveyers.

4. In a packaging machine having two parallel synchronously movable conveyers, apparatus for transferring articles from a first of the conveyers to cartons carried in buckets on the second conveyer, said apparatus comprising a plurality of slidable pusher members, means carrying the pusher members parallel to and synchronously with the conveyers, stationary cam means disposed in spaced relation to the pusher members, each of said pusher members having a part engageable with the cam whereby each pusher member upon engagement with the cam will slide and move transversely across the first conveyer and transfer articles therefrom into cartons on the second conveyer, a normally quiescent shift arm engageable with the pusher member, reciprocatory drive means, and detector means for sensing the presence of cartons in the buckets of the second conveyer, said detector means being controllably associated with the shift arm and being operable to couple the drive means to the shift arm when a carton fails to appear in a bucket, said shift member being responsive to said drive means and being operable to shift the pusher member from an operative path wherein the engageable part will be intercepted by the cam to a non-operative path wherein the cam will fail to engage the part.

5. In a packaging machine having two parallel synchronously movable conveyers, apparatus for transferring articles from the first conveyer to cartons carried on the second conveyer, said apparatus comprising a plurality of pusher members mounted to slide across the first conveyer and to push articles therefrom into the cartons on the second conveyer, means supporting and moving the pusher members parallel to and in synchronism with the conveyers, cam means for engaging and sliding said pusher members along an operative article transfer path whereby each of the pusher members moves articles into respective cartons on the second conveyer, shift means for shifting pusher members from the operative path to an inoperative path, wherein the cam means will fail to engage and slide the pusher members, detector means operatively associated with the second conveyer for sensing an absence of cartons on the second conveyer, reciprocating drive means associated with the shift means, and means associated with the detector means for drivingly coupling the drive means to the shift means when the detector means senses the absence of a carton on the second conveyer.

6. Apparatus according to claim 5 including a second cam means for engaging said pusher members moving along the inoperative path, said second cam means being operable to shift the pusher members from the inoperative path to the operative path and thereby to return the pusher members to a normal slide positioning for subsequent operations.

7. In a packaging machine having two parallel synchronously movable conveyers, apparatus for transferring articles from the first conveyer into cartons carried on the second conveyer, said apparatus comprising a plurality of pusher members mounted to slide across the first conveyer, means supporting and carrying the pusher members parallel to and in synchronism with the conveyers, each of said pusher members having a cam engaging part fixed thereto, a first stationary cam extending diagonally across an operative path of the cam engaging part of said pusher members for sliding the pusher members across the first conveyer, said first cam having a channel extending therethrough for passing the cam engaging part when the pusher member moves along an inoperative path, and a second fixed cam extending diagonally across the path of the cam engaging part when the pusher member moves along the inoperative path, said second cam being operable to shift the pusher members from the inoperative path to the operative path.

8. In a packaging machine having two parallel synchronously movable conveyers, apparatus for transferring articles from the first conveyer into cartons carried on the second conveyer, said apparatus comprising a plurality of pusher members mounted to slide across the first conveyer, means supporting and carrying the pusher members parallel to and in synchronism with the conveyers, each of said pusher members having a cam engaging part fixed thereto, a shift arm mounted in spaced relation with the path of the cam engaging part of the pusher member, said shift arm being operable to engage the cam engaging part and to shift the pusher member from an operative path to an inoperative path, a stationary cam extending diagonally across the operative path of the cam engaging part of the pusher member, said cam means having a channel therethrough for passing the cam engaging part of a pusher member moving along the inoperative path, drive means operatively associated with the shift arm, and detector means associated with the second conveyer, said detector means being sensitive to the presence of cartons on the second conveyer and being operable to hold the drive means out of operative engagement with the shift arm when a carton is present on the second conveyer.

9. In a packaging machine having two parallel synchronously movable conveyers, apparatus for transferring articles from a first of the conveyers into cartons carried on the second conveyer, said apparatus comprising a plurality of pusher members carried parallel to and moving synchronously with the conveyers, each of said pusher members having a cam roller and being mounted to slide transversely to the direction of conveyer movement for pushing the articles from the first conveyer into the cartons, a detector arm pivotally mounted over the first conveyer for sensing the presence of cartons therein, a reciprocating drive member, a drive link in spaced relation with the drive member, a coupling device associated with the drive link and with the drive member, said coupling device being coupled to the detector arm and operable to drivingly couple the drive link to the drive means only when the detector arm fails to sense a carton on the second conveyer, a shift arm operatively coupled to the link, said shift arm being operable to engage the cam roller and to shift a pusher member from an operative position to an inoperative path, and a stationary cam positioned across the operative path of the cam rollers for operating the pusher members, said cam having a channel therethrough for passing the cam rollers in the inoperative path.

10. Apparatus according to claim 9 wherein the drive link includes a collar fixed thereto and wherein the coupling device comprises a body having a slot adapted to fit over the collar on the drive link and having a shoulder part engageable with the drive member when the device is moved to an extreme position by the detector arm whereby the motion of the drive member will be imparted to the drive link through the coupling device over the collar.

11. In a packaging machine having a conveyer for transporting articles, apparatus for selectively transferring the articles from the conveyer, said apparatus comprising a plurality of pusher members, a support means holding and carrying the pusher members in spaced relation with the conveyer, each pusher member being movably mounted on the support means, a cam means positioned in spaced relation for engagement with the pusher members, and selective means for moving selected pusher members from the spaced relationship whereupon the cam means will fail to engage the selected pusher members, said cam means being operative to move the remaining pusher members across the conveyer and to transfer selected articles therefrom.

12. In a packaging machine having a conveyer and having movable pusher members carried in spaced relation with the conveyer for transferring articles therefrom, a stationary cam for moving selected pusher members across the conveyer and for causing the articles to be selectively transferred therefrom, said stationary cam comprising a first part having a diagonally extending cam surface for engaging and moving the selected pusher members, and a second part having an opening therethrough whereby the remaining pusher members will fail to be engaged and moved by the cam.

13. In a packaging machine having a conveyer and having movable pusher members carried in spaced relation with the conveyer for transferring articles therefrom, apparatus comprising a first stationary cam positioned in spaced relation with the pusher members and with the conveyer, said first stationary cam having a diagonally extending surface for engaging and moving selected pusher members across the conveyer, said first stationary cam having an opening therethrough for permitting the remaining pusher members to pass without engagement with the diagonally extending surface, a selective means controllingly associated with pusher members for permitting selected pusher members to move into engagement with the diagonal cam surface and for shifting the remaining pusher members for passage through the opening, and a second cam for engaging and moving the remaining pusher members to the cam engageable position for a subsequent transfer operation.

References Cited in the file of this patent

UNITED STATES PATENTS

| | | |
|---|---|---|
| 1,574,224 | Wilcox | Feb. 23, 1926 |
| 1,587,556 | Schilbach | June 8, 1926 |
| 1,935,269 | Jones | Nov. 14, 1933 |
| 2,133,248 | Jones | Oct. 11, 1938 |
| 2,452,376 | Holstebroe | Oct. 26, 1948 |
| 2,728,177 | Holstebroe | Dec. 27, 1955 |
| 2,746,662 | Thompson | May 22, 1956 |
| 2,747,348 | Rose | May 29, 1956 |